United States Patent
Zhao

(10) Patent No.: US 11,398,042 B2
(45) Date of Patent: Jul. 26, 2022

(54) METHOD FOR DISPLAYING A VIRTUAL IMAGE, A VIRTUAL IMAGE DISPLAY SYSTEM AND DEVICE, A NON-TRANSIENT COMPUTER-READABLE STORAGE MEDIUM

(71) Applicant: BOE TECHNOLOGY GROUP CO., LTD., Beijing (CN)

(72) Inventor: Xingxing Zhao, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 1060 days.

(21) Appl. No.: 15/778,231

(22) PCT Filed: Dec. 18, 2017

(86) PCT No.: PCT/CN2017/116894
§ 371 (c)(1),
(2) Date: May 23, 2018

(87) PCT Pub. No.: WO2018/205623
PCT Pub. Date: Nov. 15, 2018

(65) Prior Publication Data
US 2021/0209777 A1 Jul. 8, 2021

(30) Foreign Application Priority Data
May 11, 2017 (CN) .......................... 201710332927.9

(51) Int. Cl.
*G06T 7/50* (2017.01)
*G06T 7/80* (2017.01)
(Continued)

(52) U.S. Cl.
CPC .............. *G06T 7/50* (2017.01); *B64C 39/024* (2013.01); *G06T 7/80* (2017.01); *G06T 15/005* (2013.01);
(Continued)

(58) Field of Classification Search
CPC ................... G06T 15/005; G06T 19/20; G06T 2207/10028; G06T 7/50; G06T 7/80; H04N 21/21805; H04N 21/234
See application file for complete search history.

(56) References Cited

U.S. PATENT DOCUMENTS

| | | | | |
|---|---|---|---|---|
| 2002/0105518 | A1* | 8/2002 | Napoli | .................... G06T 15/20 |
| | | | | 348/E13.059 |
| 2010/0111370 | A1* | 5/2010 | Black | ................. G06K 9/00369 |
| | | | | 382/111 |

(Continued)

FOREIGN PATENT DOCUMENTS

| | | |
|---|---|---|
| CN | 202677012 U | 1/2013 |
| CN | 103118230 A | 5/2013 |

(Continued)

OTHER PUBLICATIONS

Program Park, Series-Greedy Triangular Projection Algorithm for 3D Reconstruction, Apr. 1, 2016 (Year: 2016).*

(Continued)

*Primary Examiner* — Ming Wu
(74) *Attorney, Agent, or Firm* — Syncoda LLC; Feng Ma

(57) ABSTRACT

The present disclosure provides a method for displaying a virtual image, a virtual image display system and device, achieving 3D dynamic real-time navigation. The method includes capturing a plurality of first depth images by a first image capturing device comprising one or more first depth cameras from a plurality of positions at a same time; transmitting the first depth images to a central computing device in real time; integrating the plurality of first depth images as one frame, based on calibration parameters of the one or more first depth cameras; performing point cloud stitching of frames; obtaining point cloud data for the frames in an order one by one; rendering an image of each of the (Continued)

frames corresponding to a user's current location and azimuth angle in the order; and displaying the image being rendered.

17 Claims, 9 Drawing Sheets

(51) Int. Cl.
    *B64C 39/02*     (2006.01)
    *G06T 15/00*     (2011.01)
    *G06V 20/13*     (2022.01)

(52) U.S. Cl.
    CPC .......... *G06V 20/13* (2022.01); *B64C 2201/12* (2013.01); *G06T 2207/10028* (2013.01)

(56) References Cited

U.S. PATENT DOCUMENTS

| | | | | |
|---|---|---|---|---|
| 2012/0254044 A1* | 10/2012 | Flanagan | ......... | G06Q 10/06395 705/301 |
| 2014/0225978 A1* | 8/2014 | Saban | .................... | H04N 1/387 348/14.07 |
| 2015/0269438 A1* | 9/2015 | Samarasekera | ...... | G08G 5/0069 382/154 |
| 2016/0073091 A1* | 3/2016 | Hillebrand | ........... | H04N 13/246 348/48 |
| 2016/0150217 A1* | 5/2016 | Popov | .................. | H04N 13/257 348/47 |

FOREIGN PATENT DOCUMENTS

| | | |
|---|---|---|
| CN | 104214590 A | 12/2014 |
| CN | 105939481 A | 9/2016 |

OTHER PUBLICATIONS

CN First Office Action in Application No. 201610012547.2, dated Jan. 23, 2018.

International Search Report and Written Opinion dated Feb. 24, 2018 in PCT/CN2017/116894.

* cited by examiner

METHOD FOR DISPLAYING A VIRTUAL IMAGE, A VIRTUAL IMAGE DISPLAY SYSTEM AND DEVICE, A NON-TRANSIENT COMPUTER-READABLE STORAGE MEDIUM

CROSS-REFERENCE TO RELATED APPLICATION

The present application claims priority to Chinese Patent Application No. 201710332927.9 filed on May 11, 2017, the disclosure of which is hereby incorporated by reference in its entirety.

TECHNICAL FIELD

The present disclosure relates to the field of augmented reality (AR) and virtual reality (VR) technologies, and more specifically relates to method for displaying a virtual image, a virtual image display system and device, and a non-transient computer-readable storage medium.

BACKGROUND

In recent years, with the development of Augmented Reality (AR) technologies and Virtual Reality (VR) technologies, panoramic videos become more and more popular.

AR generally refers to a view of a real-world environment with some or all elements "augmented," e.g., replaced, added, re-generated, extracted, modified, diminished, abstracted, re-rendered, simulated, etc. with computer-generated or extracted data such as images, videos, graphics, sound, position (such as GPS) data, etc.

VR generally refers to replacing the real-world environment with a computer-simulated one. Sometimes AR is also considered as a type of VR. AR and VR images can be rendered through headsets, head-mounted displays (HMD), goggles, glasses, etc. A panoramic view, e.g., a field of view wider than a user's eye view, can be achieved by allowing the user to turn his or her head to see different images as if in the real-world environment. The panoramic view can often achieve 360°.

However, conventional AV/VR-based panoramic videos are captured with typical 360° panoramic cameras, and as a result, a viewer can only view the panoramic videos at the camera's location, but the panoramic videos are not available at other locations.

SUMMARY

Various embodiments of the present disclosure provide methods for displaying a virtual image, for example navigation methods; and virtual image display systems and devices, for example systems with panoramic views, and AR/VR client devices that can realize 3D dynamic real-time navigation.

In an aspect, a method for displaying a virtual image is provided. The method can include: capturing a plurality of first depth images by a first image capturing device including one or more first depth cameras from a plurality of positions at a same time; transmitting the first depth images to a central computing device in real time; integrating the plurality of first depth images as one frame, based on calibration parameters of the one or more first depth cameras; performing point cloud stitching of frames; obtaining point cloud data for the frames in an order one by one; rendering an image of each of the frames corresponding to a user's current location and azimuth angle in the order; and displaying the image being rendered.

In some embodiments, the one or more first depth cameras are movable and configured to capture the depth images from the plurality of positions.

In some embodiments, the one or more first depth cameras are configured to move among the plurality of positions through at least one of a rigid arm, a gimbal, a cable, or an unmanned aerial vehicle (UAV).

In some embodiments, the one or more first depth cameras are configured to capture the depth images around a target area with a 360° coverage.

In some embodiments, the method can further include: capturing a plurality of second depth images with a second image capturing device including a plurality of second depth cameras at the same time; transmitting the plurality of second depth images to the central computing device in real time; and integrating the plurality of second depth images and the plurality of first depth images as the one frame, based on calibration parameters of the one or more first depth cameras and the plurality of second depth cameras; wherein the second image capturing device has a second ground clearance and a second pitching angle both different from a first ground clearance and a first pitching angle of the first image capturing device.

In some embodiments, the method can further include obtaining calibration parameters of a depth camera of the first or second image capturing device, including: using a preset polyhedron as a calibration object, wherein each face of the calibration object comprises a checkerboard and each face is distinguished by different colors; capturing images of a specific face of the calibration object by the depth camera at a plurality of angles, by changing an angle of the calibration object in space; transmitting the images; calculating internal parameters and external parameters of the depth camera, based on the images of the specific face; and obtaining calibration parameters according to the internal parameters and the external parameters.

In some embodiments, the performing the point cloud stitching comprises employing at least one of: an iterative closest point (ICP) algorithm, an iterative closest line (ICL) algorithm, or an iterative closest triangle patch registration (ICT) algorithm.

In some embodiments, the method can further include: compressing and storing point cloud data by at least one of a uniform sampling method, a magnification reduction method, a chord offset method, or a grid method.

In some embodiments, the compressing and storing the point cloud data can include employing an octree mode of the grid method.

In some embodiments, rendering the image of each of the frames corresponding to a user's current location and azimuth angle in the order includes: performing a point cloud data triangulation, for each of the frames sequentially in the order; modeling color brightness in a graphics processor; obtaining the user's current location and azimuth angle; inputting the user's current location and the azimuth angle into a rendering engine of the graphics processor; and rendering the image at a viewing angle corresponding to the current location and azimuth angle by the rendering engine.

In some embodiments, the performing the point cloud data triangulation includes employing at least one of a changing edge method, a point addition method, or a division possession method.

In some embodiments, the performing the point cloud data triangulation includes employing greedy triangle projection of the division possession method.

In some embodiments, the obtaining the user's current location and azimuth angle includes employing an instant positioning technique.

In some embodiments, the obtaining the user's current location and azimuth angle comprises employing a Simultaneous Localization and Mapping (SLAM) technique.

In some embodiments, the one or more first depth cameras have a coverage of 360°.

In some embodiments, the method further includes eliminating redundant data, after the preforming point cloud stitching of frames.

In another aspect, a virtual image display system is provided, including: a first image capturing device; a central computing device; and a virtual image display device; wherein: the first image capturing device including one or more first depth cameras is configured to capture first depth images and transmit the first depth images to the central computing device in real time; the central computing device is configured to: integrate the plurality of first depth images as one frame, based on calibration parameters of the one or more first depth cameras; perform point cloud stitching of frames; and obtain point cloud data for the frames in an order one by one; the virtual image display device is configured to: render an image of each of the frames corresponding to a user's current location and azimuth angle in the order; display the images being rendered.

In some embodiments, the virtual image display system can further include: a second image capturing device including a plurality of second depth cameras, wherein: the second image capturing device has a second ground clearance and a second pitching angle both different from a first ground clearance and a first pitching angle of first image capturing device; and the second image capturing device is configured to: transmit a plurality of second depth images captured by the plurality of second depth cameras to the central computing device in real time.

In some embodiments, the central computing device comprises a processor and a memory; the memory stores calibration parameters of the one or more first depth cameras; the processor is configured to: integrate a plurality of depth images as the one frame, based on calibration parameters of the one or more first depth cameras, and perform the point cloud stitching of the frames; and obtain the point cloud data for the frames in the order one by one.

In some embodiments, the processor is further configured to: eliminate redundant data; and compress and save the point cloud data in the memory.

In some embodiments, the one or more first depth cameras comprise an RGBD camera.

In another aspect, a virtual image display device is provided, including: a positioning detector; a controller; a graphics processor; and a display screen; wherein: the positioning detector is configured to obtain a user's current location and azimuth angle; the controller is configured to: import point cloud data stored from a central computing device; and sequentially transmit the point cloud data of each frame to the graphics processor according to an order of obtaining the point cloud data of each frame in all frames; the display screen is configured to display the images to the user.

In yet another aspect, a non-transient computer-readable storage medium having instructions stored thereon for displaying a virtual image is provided. The instructions can include: capturing a plurality of first depth images by a first image capturing device comprising one or more first depth cameras from a plurality of positions at a same time; transmitting the first depth images to a central computing device in real time; integrating the plurality of first depth images as one frame, based on calibration parameters of the one or more first depth cameras; performing point cloud stitching of frames; obtaining point cloud data for the frames in an order one by one; rendering an image of each of the frames corresponding to a user's current location and azimuth angle in the order; and displaying the image being rendered.

In some embodiments, the instructions can further include importing the point cloud data to a virtual image display device in the order.

Other aspects and embodiments and their advantages may become apparent in view of the following description and the drawings.

BRIEF DESCRIPTION OF THE DRAWINGS

To more clearly illustrate some of the embodiments, the following is a brief description of the drawings. The drawings in the following descriptions are only illustrative of some embodiments of the disclosure. For those of ordinary skill in the art, other drawings of other embodiments can become apparent based on these drawings.

Figure 1:
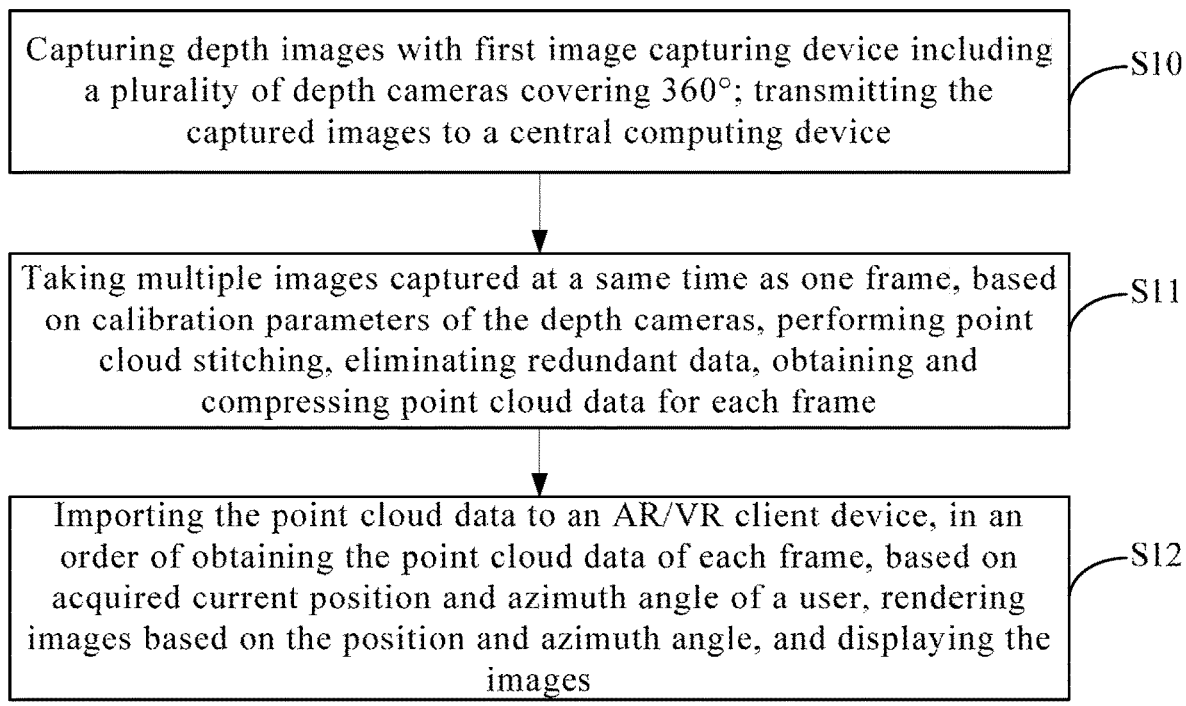
FIG. 1 is a first flow diagram of a navigation method in a panoramic scene provided by some embodiments of the present disclosure.

In the drawings: 10: calibration object; 100: target object/area; 101: first face; 102: second face; 103: third face; 104: fourth face; 20: first image capturing device; 201: first depth cameras; 201a: first-first depth camera; 201b: second-first depth camera; 201c: third-first depth camera; 201d: fourth-first depth camera; 30: central computing device; 301: processor; 302: memory; 40: virtual image display device; 401: positioning detector; 402: controller; 403: graphics processor; 404: display screen; 50: second image capturing device; 501: second depth cameras.

DETAILED DESCRIPTION

In the following, with reference to the drawings of various embodiments disclosed herein, the technical solutions of the embodiments of the disclosure will be described in a clear and fully understandable way.

It is obvious that the described embodiments are merely a portion but not all of the embodiments of the disclosure. Based on the described embodiments of the disclosure, those ordinarily skilled in the art can obtain other embodiment(s), which come(s) within the scope sought for protection by the disclosure.

In a first aspect, some embodiments of the present disclosure provide a method for displaying a virtual image, as shown in FIG. 1. The method can be, for example, a navigation method in a panoramic scene. The method can comprise the following steps.

S10: the first image capturing device 20 captures images, for example depth images, of a target object or a target area. A depth image can refer to an image or image channel including depth (e.g., distance) information with respect to distances between surfaces of the object to the first image capturing device 20.

The captured depth images can be transmitted to a central computing device in real time. The transmission can be wireless, or through wires. The central computing device can be or include, for example, a processor, a central processing unit (CPU), or any other device (such as a smart phone) with computing capability.

The first image capturing device 20 can include one or more first depth cameras 201. The first depth cameras 201 can include cameras that can capture depth information, for example through focusing, stereo triangulation with a stereo or multiple-camera setup, time-of-flight techniques, interferometry, coded aperture, structured light, or other technologies.

In some embodiments, the first depth cameras 201 can be realized using conventional cameras. In some other embodiments, light-field cameras can be employed to capture both light intensities, color, directional, and/or phase information.

The first depth cameras 201 can have a wide-angle coverage, such as a coverage of 360°. The wide-angle coverage can produce panoramic images or views.

Figure 2:
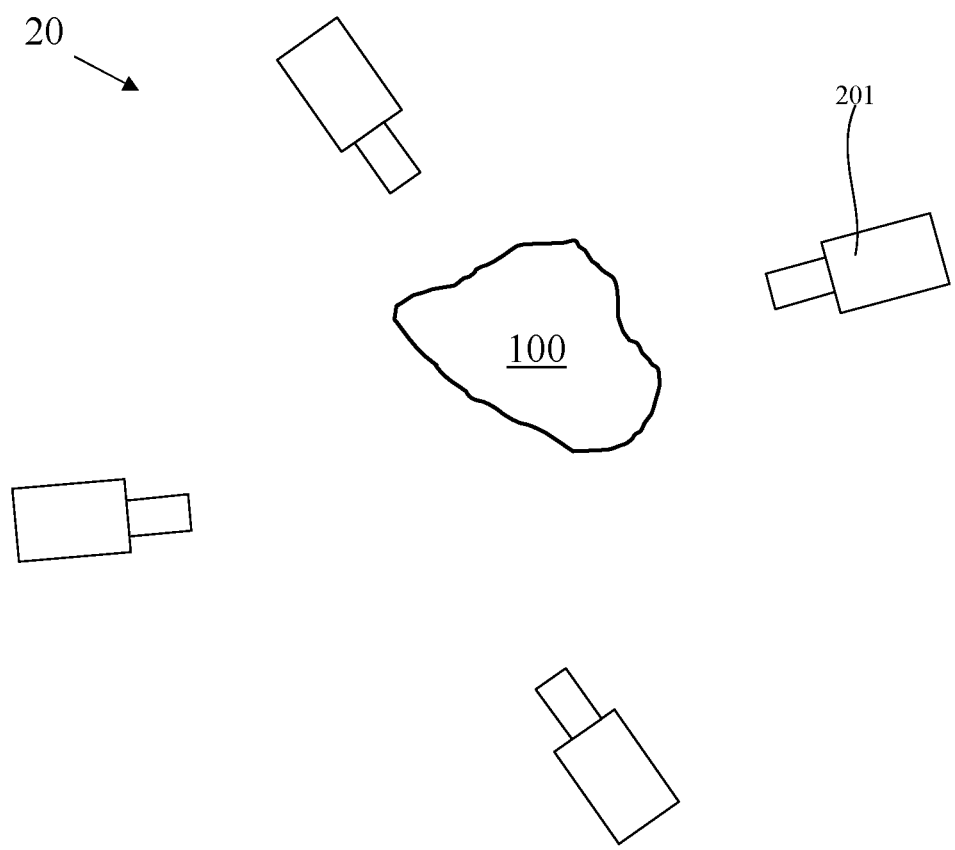
FIG. 2 is a schematic diagram of a first image capturing device including a plurality of pre-positioned depth cameras according to some embodiments of the present disclosure.

As shown in FIG. 2, the first image capturing device 20 can be placed outside a target area or a target object 100. For example, the plurality of first depth cameras 201 can be disposed at edges of the target area. The plurality of first depth cameras 201 of the first image capturing device 20 can capture images of the area from various directions, such as in the inward directions from various positions outside the target area.

The target area can be an indoor area, or an outdoor area such as a mountainous area, etc. One or more target objects can be in the target area.

Each of the first depth cameras 201 of the first image capturing device 20 can capture images independently, and can transmit or upload the captured images (e.g., depth images) to the central computing device. According to some embodiments, once an image is captured by a depth camera, it is uploaded to the central computing device in real time.

In some embodiments, the first image capturing device 20 can include, for example, three first depth cameras 201, four first depth cameras 201, five first depth cameras 201, and so on. In general, the larger number of the first depth cameras 201, the more complete the recorded information is. A smaller number of the first depth cameras 201 can result in less recorded information.

In some other embodiments, newer types of cameras can be adopted to record more or even complete information with fewer cameras, or even with a single camera. Such newer types of cameras can include, for example, a light-field camera, a 3D scanner, a movable camera that can be computer-controlled to move about or around the target area or the target object(s), etc. The movable camera can be moved with one or more mechanical arms, one or more cables, or autonomously carried by a vehicle such as an unmanned aerial vehicle (e.g., drone) that can move about the target area and cover the target area from various positions, angles, perspectives, or even cover the target area completely in 3D.

In some embodiments, the plurality of first depth cameras 201 of the first image capturing device 20 can be placed on a same horizontal plane. In some other embodiments, the plurality of first depth cameras 201 can be positioned in 3D. In some embodiments, the location, field of view, and/or pointing direction of each depth cameral can be adjusted according to actual situations and needs.

S11: in some embodiments, the central computing device can employ a plurality of the first depth images captured at a same time by all the plurality of first depth cameras 201 as one frame. Based on calibration parameters of the plurality of first depth cameras 201, the central computing device can perform a plurality of operations on the frame, such as point cloud stitching, eliminating redundant data, and obtaining point cloud data for each frame. The point cloud data can then be compressed and saved. According to some embodiments, each depth camera 201 can capture one image at the same time. In some other embodiments, each depth camera 201 can capture multiple images at the same time.

Through calibrations of the first depth cameras 201, correspondence between a two-dimensional image coordinate system and a three-dimensional world coordinate system can be determined. For example, after each depth camera 201 is appropriately calibrated, the actual location of the corresponding object in the three-dimensional world can be calculated based on the two-dimensional coordinate of the object in the images captured by the first depth cameras 201.

Calibrating the first depth cameras 201 can include a process of determining their internal and external parameters. The internal parameters can be inherent to the first depth cameras 201, including for example internal geometrical and optical parameters independent of positional parameters of the first depth cameras 201. For example, the internal parameters can include coordinates of a center of images, a focal length, a scale factor, the lens distortions, etc.

The external parameters can include a transformation matrix and a translation matrix used to determine a three-dimensional location and direction relationship between the coordinate system of the first depth camera 201 and a specified world coordinate system.

In some embodiments, once the first depth camera 201 is calibrated, the first depth camera 201 should not be moved. The calibration process may need to be performed again if movement occurs. Therefore, some embodiments of the present disclosure employ advanced calibration based on the placement location and the angle of each depth camera 201 of the first image capturing device 20 prior to the first image capturing device 20 capturing a panoramic image.

In some other embodiments, however, so long as the position and attitude of the first depth camera 201 can be accurately determined, the first depth camera 201 can be moved between pre-determined locations with predetermined attitudes at the corresponding pre-determined locations to achieve the same results as fixed-location depth camera(s) 201.

Various embodiments of the present disclosure do not limit a specific method for obtaining the calibration parameters of the first depth camera 201. In some embodiments, for example, traditional calibration methods, such as a linear change method, a Tsai two-step method, a Weng iterative method, a self-calibration method, a vanishing-point calibration method, can be employed, as long as the internal parameters and the external parameters of the first depth camera 201 can be determined.

In some embodiments of the present disclosure, the self-calibration method can include self-calibration by the solving a Kruppa equation directly, a stratified stepwise calibration method, a self-calibration method based on quadratic surfaces, and so on.

In some embodiments of the present disclosure, the stratified stepwise calibration method can include a Hartley method, a Heyden method, or a Pollefeys method. These methods are all based on projection calibration, taking an image as a benchmark to perform projection alignment. For example, the number of the unknowns can be reduced to 8 (including 3 infinity plane parameters, and 5 internal parameters of the camera, excluding overall constant factors). Subsequently, all the unknowns can be solved at the same time using a nonlinear optimization algorithm.

In some embodiments, if calibration parameters are obtained with the self-calibration method, because the self-calibration method does not require a calibration object, the first depth camera 201 can be calibrated with a correspondence between the images. The calibration is independent of the scene or a motion of the first depth camera 201. Therefore, the application of the depth cameras is more flexible and convenient.

In some embodiments, if the vanishing point calibration method is employed to obtain the calibration parameters, the method only requires at least two sets of parallel lines that are orthogonal in the acquired image, and the calibration speed is very fast.

In some embodiments of the present disclosure, the central computing device, taking a plurality of images captured at the same time by all the first depth cameras 201 as one frame, based on the calibration parameters of the first depth cameras 201, performs point cloud stitching, eliminates redundant data, and obtains point cloud data for each frame, which are then compressed and saved. This process can include the following steps according to some embodiments.

For example, in a first step, the central computing device takes a plurality of images captured at a first time by all the first depth cameras 201 as the first frame. At the first time, each depth camera 201 captures one image independently. Based on the calibration parameters of the first depth cameras 201, performs point cloud stitching, eliminates redundant data, and obtains the point cloud data for the first frame, which are then compressed and saved.

Next, in a second step, the central computing device takes a plurality of images captured at a second time (later than the first time) by all the first depth cameras 201 as a second frame. At the second time, each depth camera 201 captures one image independently, based on the calibration parameters of the first depth cameras 201, performs point cloud stitching, eliminates redundant data, and obtains the point cloud data for the second frame, which are then compressed and saved.

Next, in a third step, the central computing device, taking a plurality of images captured at a third time (later than the second time) by all the first depth cameras 201 as the third frame. At the third time, each depth camera 201 captures one image independently, based on the calibration parameters of the first depth cameras 201, performs point cloud stitching, eliminates redundant data, and obtains the point cloud data for the third frame, which are then compressed and saved.

Further steps can be included, and according to the order of the time sequence, point cloud data are obtained frame by frame. Because different first depth cameras 201 can capture a same portion of the target object or target region, redundancy may need to be eliminated for the same portion, and only one set of data for the same portion are retained during the stitching and fusion process according to some embodiments.

S12: in some embodiments of the present disclosure, the virtual image display device imports the point cloud data stored in the central computing device. Based on the acquired current location information and azimuth angle of the user, in the order of obtaining the point cloud data of each frame in all the frames, the virtual image display device sequentially renders images from the point cloud data of each frame at a viewing angle corresponding to the user's current location information and azimuth angle. The rendered images can then be transmitted to a screen for display to the user.

More specifically, according to some embodiments, in the order of obtaining the point cloud data of each frame in all the frames, first, based on the user's current location information and azimuth angle, the virtual image display device can render a first image from the point cloud data of the first frame at the viewing angle corresponding to the user's current location information and azimuth angle. The first image is then transmitted to the display screen for display to the user.

Next, based on the user's current location information and azimuth angle, the virtual image display device renders a second image for the point cloud data of the second frame at a viewing angle corresponding to the user's current location information and azimuth angle. The second image can then be transmitted to the display screen to display. As such, a sequence of images can be displayed to the user, forming a panoramic video.

In some other embodiments, the sequence of images can be rendered substantially simultaneously or inter-laced, for example based on a time-division multiplication algorithm, while achieving similar effects of sequentially displaying the images as the process described above.

In some embodiments, because the user's location and the azimuth angle can be constantly changing, the current location information and the azimuth angle can be different from frame to frame, and the images are rendered for different corresponding viewing angles from the point cloud data of each frame.

For example, when the first image is rendered at the corresponding viewing angle for the point cloud data of the first frame, the user's current location information and the azimuth angle can be different from the user's current location information and the azimuth angle when the second image is rendered at the corresponding viewing angle for the point cloud data of the second frame.

Some embodiments of the present disclosure provide a navigation method, for example in a panoramic scene.

Specifically, a plurality of first depth cameras 201 can transmit the depth images captured in real-time to the central computing device. The central computing device, taking a plurality of depth images captured at a same time by all the first depth cameras 201 as one frame, in the order of a time sequence, performs point cloud stitching frame by frame to obtain the point cloud data for each frame, which are then compressed and saved.

A user's AR/VR client device can import the point cloud data stored in the central computing device. In the order of obtaining the point cloud data of each frame in all the frames, images can be sequentially rendered from the point cloud data of each frame based on the user's current location information and azimuth angle. When the user changes his or her viewing angle or moves, the image at a viewing angle corresponding to the user's current location information and azimuth angle can be rendered. As a result, 3D dynamic real-time navigation can be realized.

In some embodiments of the present disclosure, the method further comprises employing a second image capturing device to capture images and transmit the captured depth images to the central computing device in real time. The second image capturing device can be located over the first image capturing device 20 with a shooting angle directed upward. The second image capturing device can also comprise a plurality of second depth cameras.

In some embodiments, the central computing device, taking a plurality of images captured at the same time by all the first depth cameras 201 as one frame, based on the calibration parameters of the first depth cameras 201, performs point cloud stitching. More specifically, this process can include: the central computing device, taking a plurality of images captured at the same time by all the first depth cameras 201 of both the first image capturing device 20 and the second image capturing device (not shown) as one frame, based on the calibration parameters of the first depth cameras 201, performs point cloud stitching.

In some embodiments, advanced calibration can be performed for the second image capturing device according to the placement location and the angle of each depth camera 201 of the second image capturing device, as in the case for the first image capturing device 20.

In some embodiments, the second image capturing device is positioned above the first image capturing device 20 with an image capturing attitude directed upward. As such, the second image capturing device can photograph an upper space over the space captured by the first image capturing device 20. In this way, when taking a plurality of images captured at the same time by all the first depth cameras 201 of both the first image capturing device 20 and the second image capturing device as one frame, after performing the point cloud stitching, not only a panoramic image of a certain height in the shooting area of the first image capturing device 20 can be obtained, but also the image can extend upward, for example reaching to the sky.

In some embodiments, the number of the first depth cameras 201 in the second image capturing device is not limited. For example, the second image capturing device can comprise one camera, two cameras, three cameras, four cameras, etc.

In some embodiments of the present disclosure, by including the second image capturing device, when the user, wearing the virtual image display device, looks upward, an image can still be rendered at a viewing angle corresponding to the current location information and the azimuth angle, thereby improving the user's experience.

Figure 3:
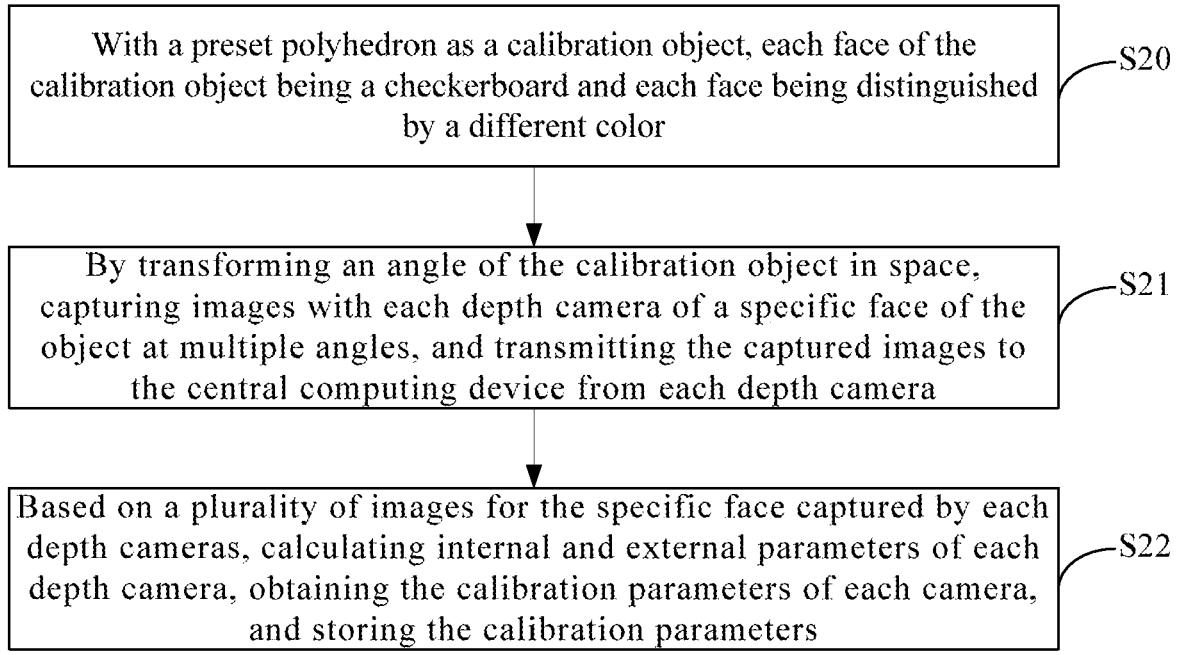
FIG. 3 is a second flow diagram of a navigation method in a panoramic scene provided by some embodiments of the present disclosure.

In some embodiments, the method further includes obtaining calibration parameters. As illustrated in FIG. 3, obtaining the calibration parameters for any image capturing devices can include the following steps.

S20: employing a preset polyhedron as a calibration object. Each face of the calibration object can be a checkerboard, for example. Each face can also be distinguished by different colors.

Distinguishing each face by different colors can facilitate the same depth camera 201 using the captured images of one specific face as a calibration face for subsequent calibrations.

Figure 4:
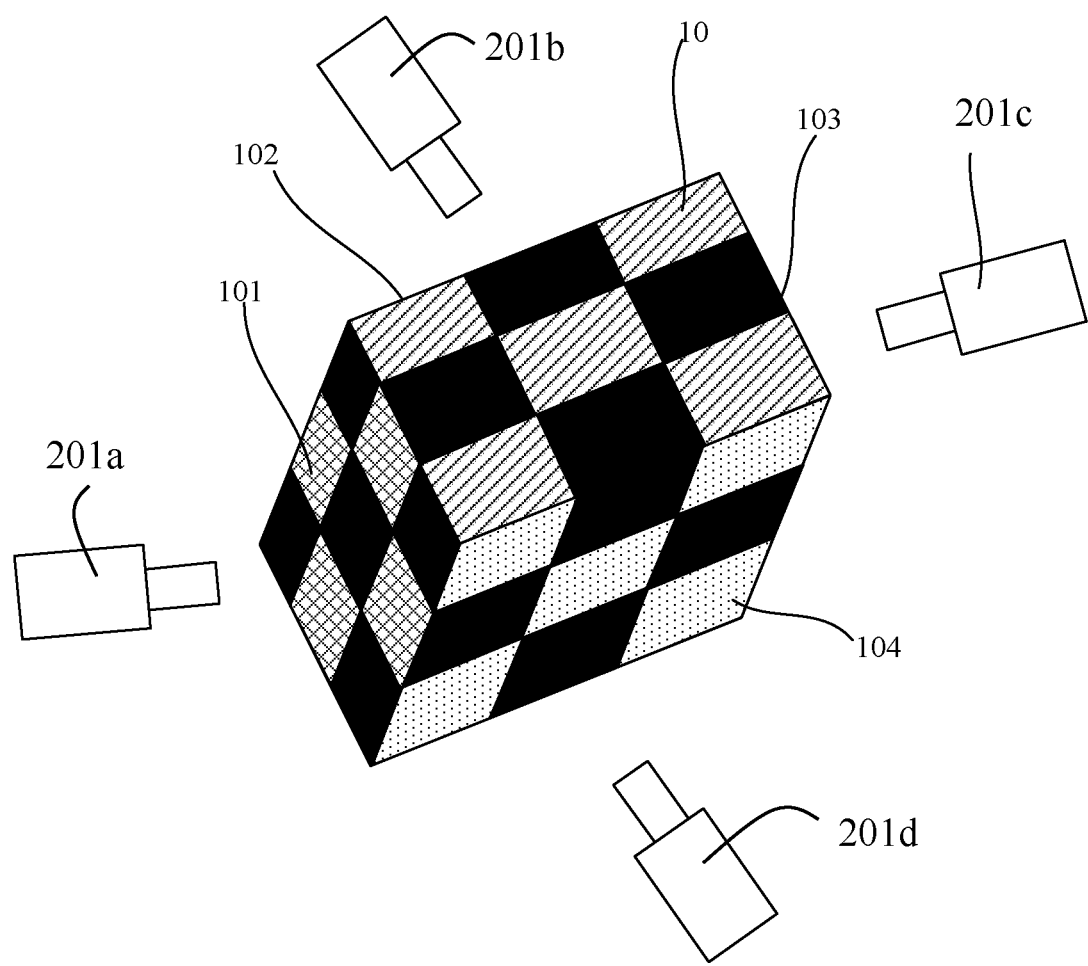
FIG. 4 is a first schematic diagram illustrating that the first image capturing device photographs a calibration object according to some embodiments of the present disclosure.

In some embodiments, as illustrated in FIG. 4, the calibration object can be a cube, and each face can be set with a 9×9 checkerboard pattern. In order to distinguish the color of each face, the six faces can be set to black and red (255, 0, 0) checkerboard, black and green (0, 255, 0) checkerboard, black and blue (0, 0, 255) checkerboard, black and cyan (0, 255, 255) checkerboard, black and magenta (255, 0, 255) checkerboard, and black and yellow (255, 255, 0) checkerboard.

S21: in some embodiments of the present disclosure, by changing an angle of the calibration object in space, the images captured by each depth camera 201 in the image capturing devices can be the images of one specific face of the calibration object at a plurality of angles. Each depth camera 201 can transmit the captured images to the central computing device for storage.

In some embodiments, as illustrated in FIG. 4, the first image capturing device 20 can include four first depth cameras 201, for example. First, the calibration object 10 is placed at a certain angle. Then, a first-first depth camera 201a captures images of the black and red checkerboard face, which is named as the first face 101. A second-first depth camera 201b captures images of the black and blue checkerboard face, which is named as the second face 102. A third-first depth camera 201c captures images of the black and cyan checkerboard face, which is named as the third face 103. A fourth-first depth camera 201d captures images of the black and yellow checkerboard face, which is named as the fourth face 104.

Figure 5:
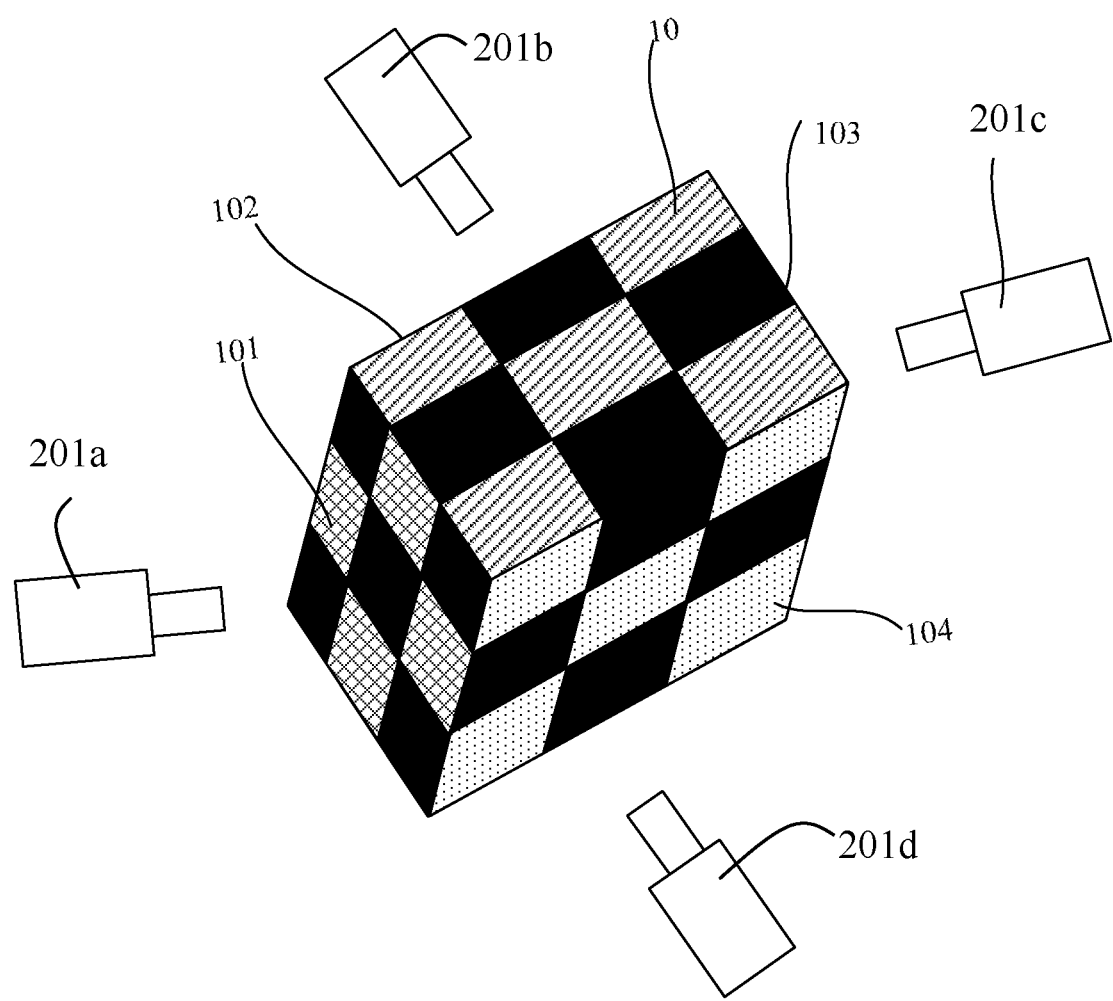
FIG. 5 is a second schematic diagram illustrating that the first image capturing device photographs a calibration object according to some embodiments of the present disclosure.

Thereafter, as illustrated in FIG. 5, changing the angle of the calibration object 10 in space, while the first-first depth camera 201a still captures images of the first face 101, the second-first depth camera 201b still captures images of the second face 102, the third-first depth camera 201c still captures images the third face 103, and the fourth-first depth camera 201d still captures images the fourth face 104. Thereafter, the angle of the calibration object 10 in space can be continuously changed. Each time after the angle of the calibration object 10 in space is changed, the first depth camera 201 can still photograph the first face 101, the second depth camera 201 can still photograph the second face 102, the third depth camera 201 can still photograph the third face 103, and the fourth depth camera 201 can still photograph the fourth face 104.

In the aforementioned steps, when changing the angle of the calibration object 10 in space, for any first depth cameras 201 in the image capturing devices, it is preferable to ensure that the first depth cameras 201 still photographs the same specific face. Because subsequent calculations of the calibration parameters are performed based on the plurality of images of the same specific face of the calibration object 10 taken by the first depth cameras 201, for any first depth camera 201, if the captured images include the images of other faces of the calibration object 10 in addition to the images of the specific face of the calibration object 10, the images of the other faces of the calibration object 10 generally will not be used.

Of course, for any first depth cameras 201 in the image capturing device, if the captured images include any images of other faces of the calibration object in addition to the images for the specific face, because the color of each face of the calibration object is different, it is straightforward to remove the images other than the images of the specific face taken by any first depth cameras 201.

In some embodiments, since because central computing device is able to identify which images are captured by which depth camera 201, it is not specified that each depth camera 201 in the image capturing devices captures different face of the calibration object 10. Two different first depth cameras 201 are allowed to photograph the same particular face.

It should be noted that those of ordinary skills in the art will appreciate that, when changing the angle of the calibration object 10 in space, there is a chance that, under two certain angles, faces of the calibration object 10 are in parallel planes. As a result, under these two angles, the images taken by each depth camera 201 can be counted as one image in the subsequent calibration calculation.

Therefore, in some embodiments, when changing the angles of the calibration object 10, it may be necessary to ensure that the plurality of images captured by each depth camera 201 in the image capturing devices at all angles satisfy the subsequent calculation requirements for the internal parameters and the external parameters of the first depth camera 201.

S22: in some embodiments, the central computing device calculates the internal parameters and the external parameters of the first depth cameras 201 based on the plurality of images of a specific face taken by each depth camera 201 in the image capturing devices, and obtains the calibration parameters of the first depth cameras 201 and stores the calibration parameters.

In some embodiments, a camera has an internal parameter matrix:

$$K = \begin{bmatrix} \alpha & \gamma & u_0 \\ 0 & \beta & v_0 \\ 0 & 0 & 0 \end{bmatrix}$$

wherein $\alpha=f/dx$, $\beta=f/dy$, f is the camera's focal length, dx is a pixel width in the direction of an x-axis, dy is a pixel width in the direction of a y-axis; $\gamma$ is a deviation of pixel in the directions of the x-axis and the y-axis; $(u_0, v_0)$ are coordinates of a principal point. $\alpha, \beta, \gamma, u_0, v_0$ are related to internal structures of the camera.

In some embodiments, by changing the orientation angles of the calibration object 10 in space, any depth camera 201 in the image capturing devices can be configured to capture a specific face of the calibration object 10, and at least three images of the specific face captured by the depth cameral can be taken at various angles of non-parallel planes. The internal parameters of each depth camera 201 can then be calculated based on, for example, a Zhang Zhengyou method.

According to some embodiments, for any depth camera 201, the more the images of a specific face taken by the first depth camera 201 at angles on non-parallel planes, the more accurately the internal parameters and the external parameters of the first depth camera 201 can be calculated.

In some embodiments, for example, the number of the images of a specific face taken by any depth camera 201 at any angles on non-parallel planes is 9. That is, the angles of the calibration object 10 are changed in space for 9 times, and the difference between any two angles is not 180° or 360°, such that the number of the images of the specific face taken by each depth camera 201 at any angles on non-parallel planes is nine. As a result, on one hand, the calibration parameters can be calculated more accurately, and on another hand, excessive complicated calibration caused by capturing too many images can be avoided.

In some embodiments, the internal parameters can be used to calculate the external parameters of the depth camera. The external parameters of the depth camera can include, for example, the location and spatial angle of the depth camera in the world coordinate system.

Some embodiments of the present disclosure can employ a preset polyhedron as a calibration object. Each face of the calibration object can be distinguished by different colors. By only changing the angles of the calibration object 10 in space, each of the first depth cameras 201 can capture a plurality of images of a specific face of the calibration object 10 at different angles, which are used to calculate the internal parameters and the external parameters of the depth camera. Therefore, the calibration parameters of a depth camera 201 can be obtained based on one calibration object 10. The method is simple and easy. The requirements on the calibration object are low, and the calibration accuracy is high.

In some embodiments, in the step S11, point cloud stitching can be performed by using an Iterative Closest Point (ICP) method, an Iterative Closest Line (ICL) method, or an Iterative Closest Triangle (ICT) method.

Among these methods, the ICL method and the ICT method are two technical branches based on the ICP method.

The ICP method can include the following steps in some implementations.

1) According to point coordinates in a point set (denoted as A), searching for corresponding nearest point set (denoted as B) on a curved surface.

Herein, the point set A can be a set of points of a plurality of images (one frame) captured by all the depth cameras at the same time.

2) Calculating coordinates of a weight center of for the two point sets A and B, and performing point set centralization to generate a new set of points.

3) Calculating a positive definite matrix (denoted as N) from the new point set, and calculating a maximum eigenvalue and a maximum eigenvector of N.

4) Because the maximum eigenvector is equivalent to a rotation quaternion when the residual sum of squares is at a minimum, the quaternion can be converted into to a rotation matrix (denoted as R).

5) After the rotation matrix R is determined, because the translation vector t is only the weight center difference between the two point sets, it can be determined by the weight centers of the two coordinate systems and the rotation matrices.

6) Calculating the point set after rotation (e.g., C) from point set A. Calculating a sum of square of distance by using the point set A and the point set C. An absolute value of the difference between two consecutive sums of square of distance can be used as an iteration judgment value.

7) When the iteration judgment value meets the requirements, the ICP registration algorithm stops iteration. Otherwise the steps 1 to 6 can be repeated until the requirements are satisfied and the iteration is stopped.

Some embodiments of the present disclosure use the ICP method, the ICL method, and/or the ICT method to perform point cloud stitching to obtain a very accurate registration effect.

In some embodiments, in the above step S11, the point cloud data can be compressed and saved by using a uniform sampling method, a magnification reduction method, a chord offset method, or a grid method, According to some embodiments of the disclosure, point cloud can be a collection data about an object's appearances, for example a contour appearance of the object or even its internal structure. Point cloud data for each point cloud can include, for example, depth information, and/or color information.

The uniform sampling method can be employed, based on a storage order of the point cloud, to retain one point for every N points and delete the other points. N is a positive integer greater than 1.

The Magnification reduction method can be employed to traverse all point cloud neighboring domains, and remove the point with the shortest distance between two points in the point cloud neighboring domains until a user's specified number is met.

The chord offset method can be employed, within a maximum chord length L, to ignore all the points with a chord deviation less than θ, and only sample a point that has the maximum chord length, or with a chord deviation not less than θ.

The grid method can be employed to divide the point cloud into grids, find a mean value of normal vectors of all the points in each grid, and keep the points on each grid with various normal vectors closest to the mean.

In some embodiments, an octree method in the grid method can be employed to compress and save the point cloud data. This process can include the following steps: employing the octree to divide the point cloud into grids, finding a mean value of the normal vectors of all the points in each grid, and keeping those points on each grid with respective normal vectors closest to the mean. In the embodiments employing this method, the point set after compression can be close to a uniform distribution.

Figure 6:
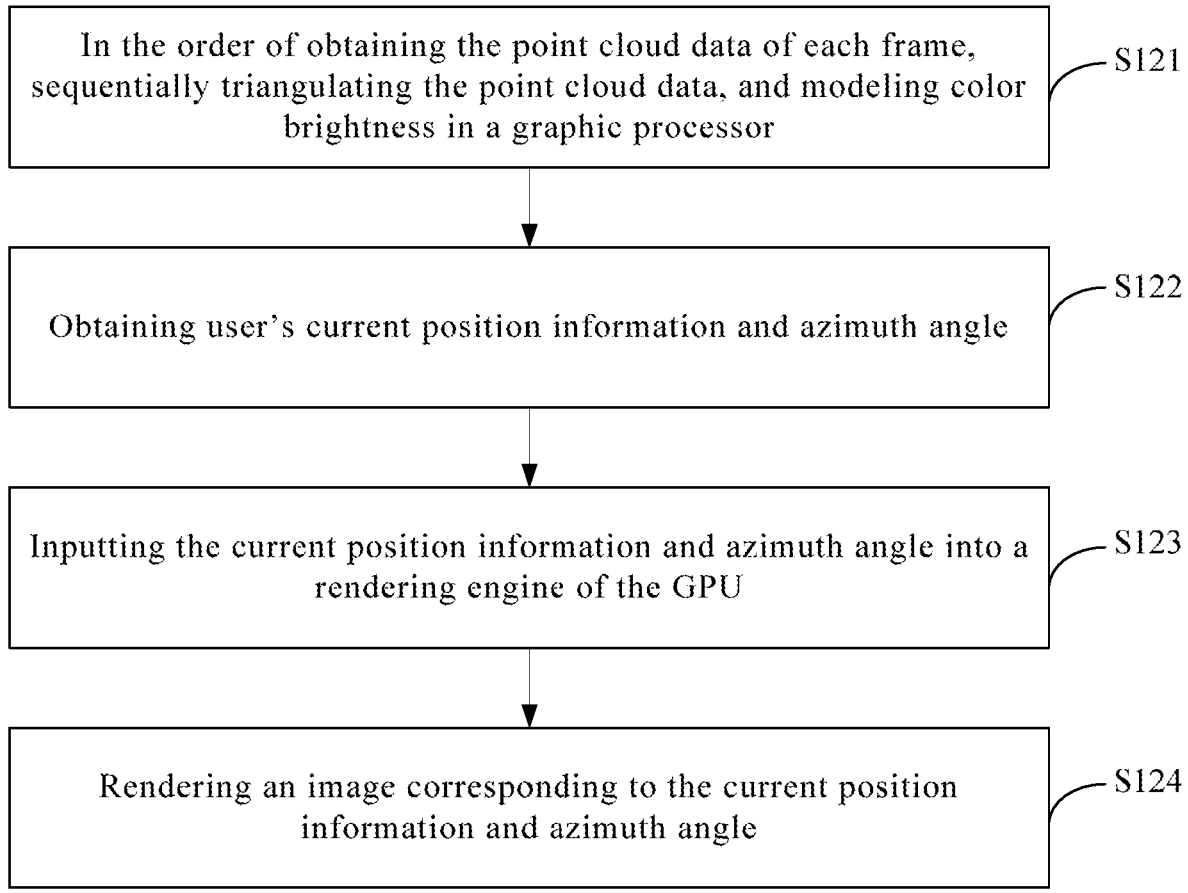
FIG. 6 is a flow diagram of rendering a perspective image for a point cloud data of any frame according to some embodiments of the present disclosure.

In some embodiments, in the step S12, as shown in FIG. 6, in the order of obtaining the point cloud data of each frame in all the frames, based on the obtained user's current location information and azimuth angle, the client device can sequentially render the images for the point cloud data of each frame at a viewing angle corresponding to the user's current location information and azimuth angle. This process can be achieved in the following substeps.

S121: in the order of obtaining the point cloud data of each frame in all the frames, sequentially triangulating the point cloud data for the point cloud data of each frame and performing color brightness modeling in a Graphic Processing Unit (GPU). It is noted that although the phrase "unit" is used here, the GPU can be realized with hardware, such as one or more processing circuits, a processor, etc., and/or with software, such as instructions stored on a non-transient computer-readable storage medium. The GPU, like other portions or devices according to various embodiments disclosed herein, can be in a modular, or non-modular design.

In some embodiments, the point cloud data can be triangulated by using one or more of an edge changing method, a point addition method, or a division possession method.

In some embodiments, a specific method for point cloud data triangulation can include the following steps: first, projecting a directed point cloud to a local two-dimensional coordinate plane, and performing triangulation within the two-dimensional coordinate plane; next, obtaining a triangular mesh surface model according to a topological connection of three points in the plane.

In some embodiments, the edge changing method can include the following steps: first, constructing a non-optimized initial triangulation; next, performing an iterative edge optimization on the convex quadrilateral formed by two triangles with a common edge.

In some embodiments, the point addition method can include the following steps: starting from a triangle, adding one point every time to ensure that the current triangulation of each step is locally optimized.

In some embodiments, the division possession method can include recursively subdividing a data domain into sub blocks to realize local optimized triangulation for each block, and then merging the sub blocks.

In some embodiments, the point cloud data can be triangulated using the greedy triangle projection method of the division possession method.

In some embodiments, the greedy triangle projection method deals with a series of points that can make the grid grow and expand (e.g., edge points), and can include extending these points until all the points that meet the geometric correctness and topological correctness are connected.

The triangulation process of this algorithm can be localized. The process can include the following steps: first, projecting a point onto a local two-dimensional coordinate plane along the normal direction of the point, and connecting other dangling points, then moving to the next point. If two sides of a face are very close, it can be specified that if the deviation of a point at its normal direction exceeds a specified angle, the point is not connected to the sample points.

In some embodiments, the specified angle can be obtained by calculating an angle between the normal line segments (ignoring the normal direction). In addition, it should be ensured that the normal directions are identical. If a normal direction consistency identifier is not set, it cannot be guaranteed that the estimated normal lines will always be consistent in their directions.

Some advantages of the greedy triangle projection method can include, for example, handling scattered point cloud with multiple connections from one or more devices (e.g., the first depth cameras 201 according to some embodiments disclosed herein).

S122: obtaining the user's current location information and azimuth angle.

In some embodiments, a real-time positioning technology can be employed to obtain the user's current location information and azimuth angle.

In some embodiments, SLAM (Simultaneous Localization and Mapping) technology can be employed to obtain the user's current location information and azimuth angle. For example, mapping can be employed to assist in positioning to acquire more accurate current location information and azimuth angle of the user.

S123: inputting the user's current location information and the azimuth angle to a rendering engine of the GPU.

In some embodiments, the setting parameters of camera's location information and azimuth angle in the rendering engine can be set as the current location information and azimuth angle.

S124: the rendering engine rendering an image at the viewing angle corresponding to the current location information and the azimuth angle of the user.

In some embodiments, the rendering can include the following processes.

Model Transformation

In some embodiments, because each model has its own coordinates, prior to becoming an image object on the display screen, the model needs to be transformed into multiple spaces or coordinate systems.

The coordinates of a model space (or model-self space) as an object can be referred to as the model coordinates. After the coordinate transformation, the model will be in the world coordinate, that is, the direction and location of the model in the scene can be determined.

View Transformation

In some embodiments, there are many objects (models) in the scene of real-time rendering, but only the area covered in the viewing angle will be rendered. The camera in the rendering engine has a placement location and an orientation direction in the world coordinate.

In some embodiments, in order to perform subsequent projection and cropping processing, the camera and the model in the rendering engine can perform the operation of view transformation to place the camera in the rendering engine at the origin of the coordinate, such that the camera in the rendering engine faces the direction of an Z axis (negative direction), while a Y axis points up and an X axis points to the right.

Vertex Coloring

In some embodiments, a so-called coloring refers to determining an effect of light on a material. This operation can be run on the vertex of the model at a geometric stage, or on various pixels at a grating stage, respectively referred to as vertex coloring and pixel coloring.

In some embodiments, at the time of vertex coloring, each vertex can store a plurality of related material data, such as vertex location, normal, color, and any other digital information related to the calculation of the coloring process.

In some embodiments, the calculation results of vertex coloring (which can be color, vector, texture coordinate, and any other coloring data) can be sent to a rasterization phase for interpolation processing.

Projection

In some embodiments, after the coloring process is completed, the rendering system can transform a visible body into a unit cube located at (−1, −1, −1) to (1, 1, 1), and the cube is referred to as an observation body. Generally, there are two ways of projection: parallel projection, and perspective projection. Because the perspective projection simulates a human visual experience, it is often used in gaming, virtual reality, and augmented reality.

Triangular Cropping

In some embodiments, when performing a cropping action, if a primitive has a vertex that falls outside the visible body, the portion outside the visible body will be cut off. A new vertex can be generated at the location where the visible body intersects the primitive. The old primitive outside the cube can be discarded.

Screen Mapping

In some embodiments, after a previous cropping step, the primitive located in the visible body are mapped to the screen. At this time, the coordinate information is still three-dimensional. The X, Y coordinates of the primitive can be transformed to the screen coordinate system. The screen coordinates plus the Z-axis coordinate can be referred to as the window coordinates.

Rasterization

In some embodiments, after obtaining the vertex, which has been processed through the transformation and the projection, and its associated coloring information, rasterization is performed to calculate and set the color of pixels that are covered by the object. This process is referred to as rasterization, or scan conversion. That is, the vertexes, which contain the depth (Z-axis) information in the two-dimensional coordinate and a variety of related color information, can be converted into screen pixels.

In some embodiments, the rasterization stage generally includes four steps, namely: triangle settings, triangle traversal, pixel coloring, and output merging.

In some embodiments, the triangle setting performs the differential on the triangle surface and other calculations about triangle surface data. The calculated data will be used for scan conversion and the interpolation processing of various coloring data generated during the geometric phase. In the GPU, this step can be implemented using a fixed hardware function processing circuit.

In some embodiments, triangle traversal is employed to determine whether the center of a pixel is covered by a triangle. If the pixel is covered by the triangle, a corresponding slice is generated.

In some embodiments, each triangle corresponds to a slice. This attribute is generated through interpolation by the three-vertex data of the triangle, such as the depth value of the slice and the coloring data during the geometric phase.

In some embodiments, the pixel coloring is the step in which all pixel-by-pixel coloring calculations are performed. The input data used in this step is the previously-interpolated coloring data. The calculation result sent to the next station by pixel coloring can be a color value, or a plurality of color values.

In some embodiments, different from triangle settings and triangle traversal, which utilize fixed hardware function units, pixel coloring can be performed with a programmable GPU core.

In some embodiments, mapping picture is the most important one among many techniques on which pixel coloring depends. The so-called mapping picture is to "paste" one or more pictures to the object.

In some embodiments, output merging implements the operation of merging the color information generated in the previous steps to form the final output of pixel colors.

In some embodiments, the cache for storing pixel color information is referred to as color cache. Under normal circumstances, it is stored in the three element colors: red, green, and blue. In addition, there is also a depth cache for storing the depth information value of corresponding pixels.

In some embodiments, after the image of the entire scene is rendered, the color cache stores the visible primitive color values seen from the camera in the rendering engine at viewing locations.

Based on the above, in some embodiments of the present disclosure, by repeating substeps S121-S124, the image at a viewing angle corresponding to the location information and the azimuth angle is rendered frame by frame, based on the current location information and azimuth angle.

It should be noted that, in some embodiments, the order of substeps S121 and S122 is not specified, and they can be performed at the same time.

Figure 7:
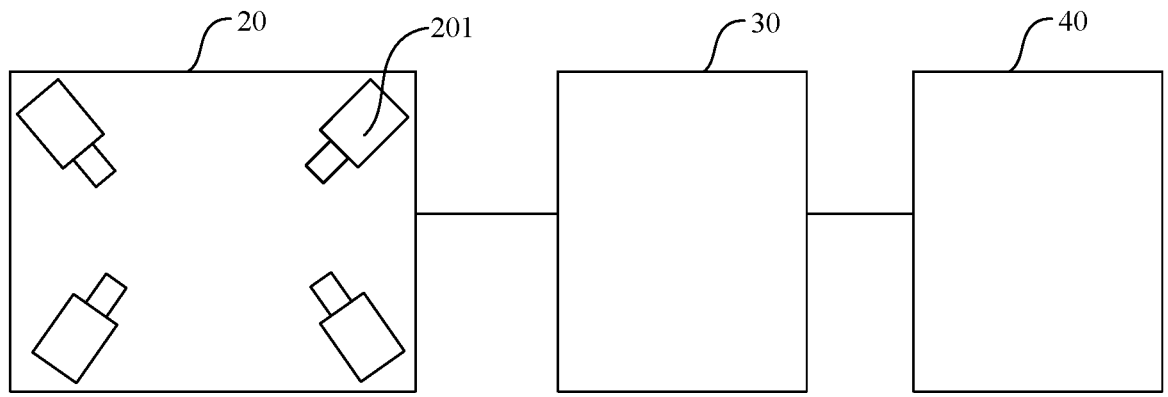
FIG. 7 is a first schematic diagram of a navigation system in a panoramic scene according to some embodiments of the present disclosure.

Some embodiments of the present disclosure provide a navigation system in a panoramic scene, as illustrated in FIG. 7. The navigation system can include a first image capturing device 20, a central computing device 30, and an AV/VR client device 40.

In some embodiments, the first image capturing device 20 is configured to capture images and transmit the captured depth images to the central computing device 30 in real time. The first image capturing device 20 can include a plurality of first depth cameras 201 with a coverage of 360°.

In some embodiments, it may be needed to construct the location of the first depth cameras 201 in the first image capturing device 20 first. The first image capturing device 20 is placed at the edge of one area. Each depth camera 201 in the first image capturing device 20 captures the area inwardly such that the range of the plurality of first depth cameras 201 in the first image capturing devices 20 covers 360°.

Once the first depth camera 201 is calibrated, the first depth camera 201 generally should not be moved. Calibration may need to be performed again if movement occurs. Therefore, after the construction of the locations of the first depth cameras 201 in the first image capturing device 20 is completed, the calibration should be performed first based on the placement location and the angle of each depth camera 201 in the first image capturing device 20.

In some embodiments, each depth camera 201 in the first image capturing device 20 performs image capturing individually, and uploads the image to the central computing device in real time once upon the image is captured.

In some embodiments, the first image capturing device 20 can include, for example, three first depth cameras 201, four first depth cameras 201, five first depth cameras 201, and so on. In general, the more the first depth cameras 201 the first image capturing device 20 includes, the more complete the recorded information is. For fewer first depth cameras 201, generally less information can be recorded.

However, as discussed above, in some embodiments fewer cameras, sometimes even a single camera, can be configured to capture images from a plurality of different positions facilitated by a positioning vehicle, such as a UAV, a gimbal, or an arm/cable and driven by a motor, and achieve effects similar to those realized by more cameras.

In some embodiments, the central computing device 30, taking all the images captured at the same time by all the first depth cameras 201 as one frame, based on the calibration parameters of the first depth cameras 201, performs point cloud stitching, eliminates redundant data, and obtains the point cloud data for each frame. The point cloud data can then be compressed and saved. In some embodiments, each depth camera 201 captures one image at one same time.

In some embodiments, the central computing device 30, taking all the images captured at the same time by all the first depth cameras 201 as one frame, based on the calibration parameters of the first depth cameras 201, performs point cloud stitching, eliminates redundant data, and obtains the point cloud data for each frame. The point cloud data can then be compressed and saved. This specific process can include the following steps.

The central computing device 30 take in a plurality of images captured at a first time by all the first depth cameras 201 as a first frame. At the first time, each depth camera 201 captures one image. Based on the calibration parameters of the first depth camera 201, the central computing device 30 performs point cloud stitching, eliminates redundant data, and obtains the point cloud data for the first frame, which are then compressed and saved.

Next, the central computing device 30, taking a plurality of images captured at a second time (later than the first time) by all the first depth cameras 201 as a second frame. At the second time, each first depth camera 201 captures one image. Based on the calibration parameters of the first depth camera 201, the central computing device 30 performs point cloud stitching, eliminates redundant data, and obtains the point cloud data for the second frame, which are then compressed and saved.

Next, the central computing device 30, taking a plurality of images captured at a third time (later than the second time) by all the first depth cameras 201 as a third frame. At the third time, each depth camera 201 captures one image. Based on the calibration parameters of the first depth camera 201, the central computing device 30 performs point cloud stitching, eliminates redundant data, and obtains the point cloud data for the third frame, which are then compressed and saved.

Further steps can be included, according to the order of the time sequence, to obtain point cloud data frame by frame. Because different first depth cameras 201 may acquire images of the same portion, the redundancy can be eliminated for the same portion, and only one set of non-redundant data are retained during the stitching and fusion process.

In some embodiments, the virtual image display device 40 imports the point cloud data stored in the central computing device 30. In the order of obtaining the point cloud data of each frame in all the frames, based on the acquired user's current location information and azimuth angle, the images for the point cloud data of each frame can be rendered sequentially at a viewing angle corresponding to the user's current location and azimuth angle. The image can then be transmitted to a display screen for display to the user.

In some embodiments, in the order of obtaining the point cloud data of each frame in all the frames, based on the user's current location and azimuth angle, the image for the point cloud data of the first frame can be rendered at a viewing angle corresponding to the user's current location and azimuth angle. The image can then be transmitted to the display screen for display to the user.

Next, based on the user's current location and azimuth angle, the image for the point cloud data of the second frame can be rendered at a viewing angle corresponding to the user's current location and azimuth angle. The image can then be transmitted to the display screen for display to the user.

Similarly, subsequent images can be rendered and displayed to the user based on the user's current location and azimuth angle, thereby giving the user a realistic experience.

Some embodiments of the present disclosure provide a navigation system in a panoramic scene, in which all the first depth cameras 201 in the first image capturing device 20 transmit the depth images captured in real-time to the central computing device 30. The central computing device 30, taking a plurality of depth images captured at the same time by all the depth cameras as one frame, in the order of the time sequence, performs point cloud stitching frame by frame and obtains the point cloud data for each frame, which are further compressed and saved.

When a user wears a AR/VR client device 40, the virtual image display device 40 can import the point cloud data stored in the central computing device 30. In the order of obtaining the point cloud data of each frame in all the frames, the virtual image display device sequentially renders the image for the point cloud data of each frame based on the user's current location and azimuth angle, such that when the user changes the viewing angle or moves, images can be rendered at a viewing angle corresponding to the user's current location and azimuth angle. As a result, 3D dynamic real-time navigation can be realized.

Figure 8:
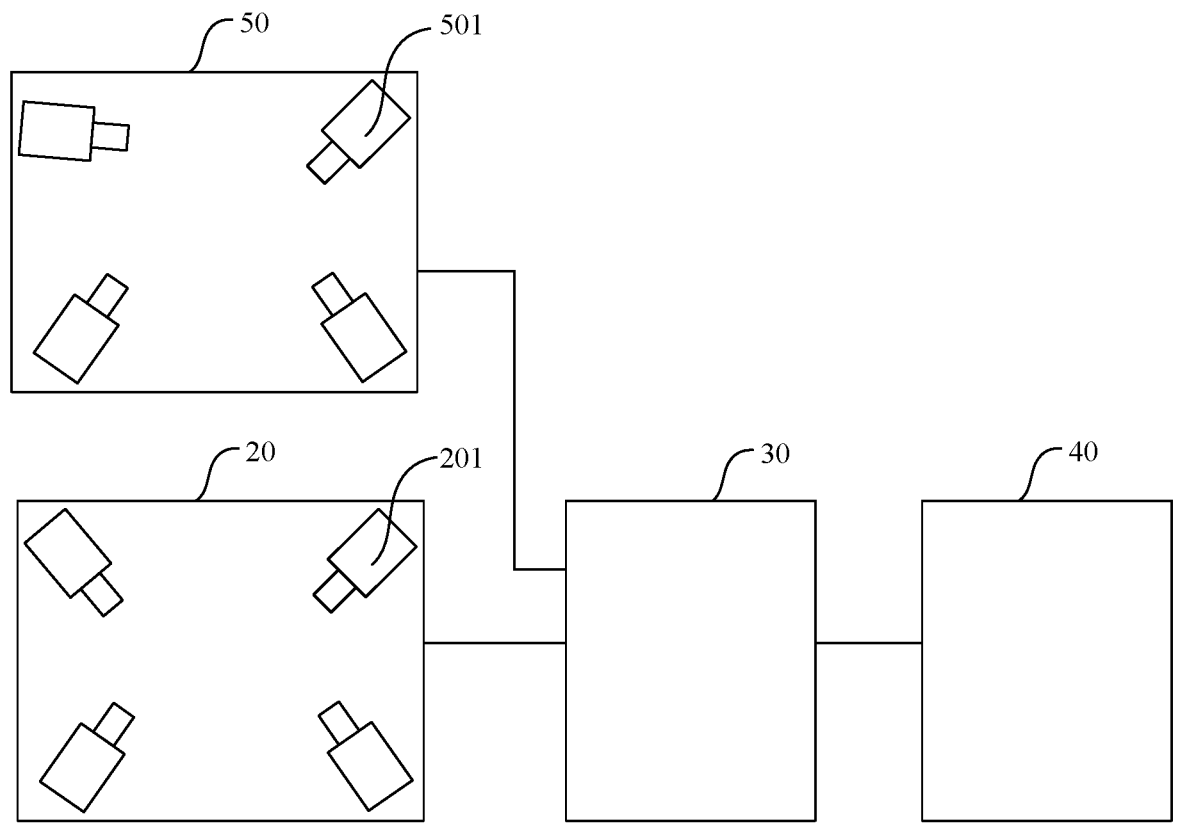
FIG. 8 is a second schematic diagram of a navigation system in a panoramic scene according to some embodiments of the present disclosure.

In some embodiments as illustrated in FIG. 8, the navigation system can further include a second image capturing device 50, which can perform image capturing and transmit the captured depth images to the central computing device 30 in real time. The second image capturing device 50 can also include a plurality of second depth cameras 501. The plurality of second depth cameras 501 can be same as the first depth cameras. The second image capturing device 50 can have a second ground clearance and a second pitching angle both different from a first ground clearance and a first pitching angle of the first image capturing device 20.

In some embodiments, the second image capturing device 50, and/or the first image capturing device 20 can include, or one or more of the depth cameras which comprises the one or more first depth cameras and the plurality of second depth cameras can be substituted with, mirrors. The mirrors can reflect light, for example, from a side of the target area/object 100 toward the opposite of the target area/object 100, where one or more first depth cameras 201 can be located and configured to capture the reflected light. As such, the number of first depth cameras 201 or the number of the pre-determined positions for a movable depth camera can be reduced.

In some other embodiments, light reflected from an ambient environment can be captured and utilized to generate images from a plurality of positions/angles. In some embodiments, single-photon counting and interference techniques can be employed for light capturing and image reconstruction. In some embodiments, one or more light sources, such as a laser, an LED light, a pulsed light source, etc. can be employed to facilitate the image capturing and reconstruction process. In some embodiments, the light sources and/or the first depth cameras 201 can be configured to scan the target area/object 100. So long as information can be obtained from a plurality of positions/angles of the target area/object 100, realistic viewing experience for the user can be constructed.

In some embodiments, the central computing device 30, taking a plurality of images captured at the same time by all the first depth cameras 201 as one frame, based on the calibration parameters of the first depth cameras 201, performs point cloud stitching. In some embodiments, this process can include: the central computing device 30, taking a plurality of images captured at the same time by all the first depth cameras 201 in the first image capturing device 20 and the second image capturing device 50 as one frame, based on the calibration parameters of the first depth cameras 201, performs point cloud stitching.

In some embodiments, after the construction of the locations of the first depth cameras 201 in the second image capturing device 50 is completed, the calibration should be performed first, based on the placement location and the angle of each second depth camera 501 in the second image capturing device 50.

In some embodiments, the second image capturing device 50 is placed above the first image capturing device 20 (e.g., a higher ground clearance) with a pointing angle directed upward (e.g., a higher pitching angle). As such, the second image capturing device 50 can photograph the upper space above the space captured by the first image capturing device 20. Therefore, when taking a plurality of images captured at the same time by all the first depth cameras 201 in the first image capturing device 20 and in the second image capturing device 50 as one frame, after performing the point cloud stitching, not only a panoramic image of a certain height in the shooting area of the first image capturing device 20 can be obtained, but also the image can extend up to the sky.

In some embodiments of the present disclosure, by adding the second image capturing device 50, when the user looks up at a height, an image can still be rendered at a viewing angle corresponding to the current location and the azimuth angle of the user, thereby improving user experience.

Figure 9:
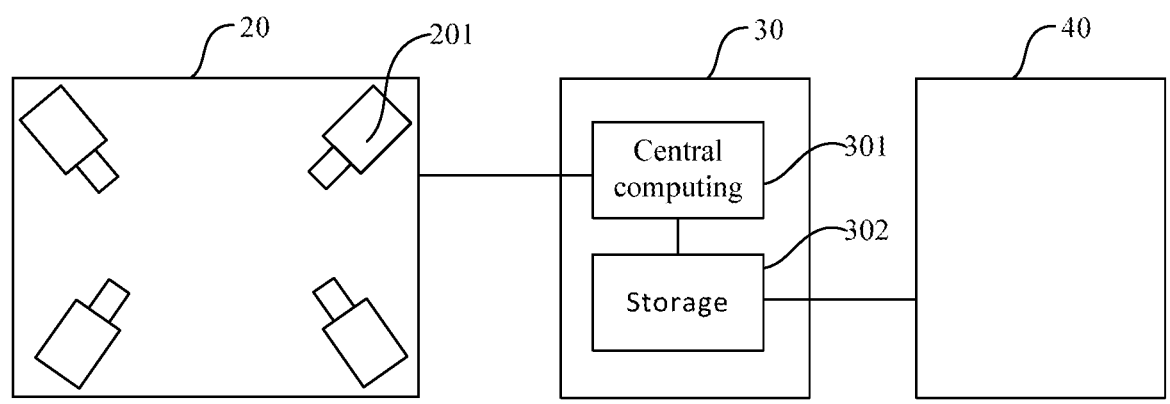
FIG. 9 is a third schematic diagram of a navigation system in a panoramic scene according to some embodiments of the present disclosure.

In some embodiments as illustrated in FIG. 9, the central computing device 30 comprises a processor 301, and a memory 302. The memory 302 stores the calibration parameters of the first depth cameras 201. It is noted that although the phrase "module" is used, the processor 301 and the memory 302 do not necessarily have modular designs, but can be realized in a number of different implementations, such as with processing circuits or other hardware devices or device portions, or with a mixture of software and hardware implementations.

In some embodiments, the central computing device 30, taking a plurality of images captured at the same time by all the first depth cameras 201 as one frame, based on the calibration parameters of the first depth cameras 201, performs point cloud stitching, eliminates redundant data, and obtains the point cloud data for each frame, which are then compressed and saved. In some embodiments, this process can include the following operations.

The processor 301, taking a plurality of images captured at the same time by all the first depth cameras 201 as one frame, according to the calibration parameters of the first depth cameras 201 stored in the memory 302, performs a point cloud stitching, eliminates the redundant data, and obtain the point cloud data for each frame, which are then compressed and saved in the memory 302.

In some embodiments, the memory 302 stores the calibration parameters of the first depth cameras 201. This can include the following operations.

In some embodiments, the processor 301, based on a plurality of images stored in the memory 302, of a specific face of a calibration object captured by each depth camera 201 in the image capturing devices, calculates the internal parameters and external parameters of the first depth camera 201 to obtain the calibration parameters of the first depth camera 201. Then, the calibration parameters can be saved in the memory 302.

In some embodiments, using a preset polyhedron as the calibration object 10, by changing the angle of the calibration object 10 in space, the images captured by each depth camera 201 in the image capturing devices are images of a specific face of the calibration object at a plurality of angles. Each depth camera 201 can transmit the captured images to the memory 302 of the central computing device for storage. Each face of the calibration object 10 can be a checkerboard, and each face can be distinguished by different colors.

As different faces are distinguished by different colors, the same depth camera 201 can use a specific face as a calibration face for subsequent calibrations.

In some embodiments as illustrated in FIG. 4, the shape of the calibration subject can be a cube, and each face of the cube can be set with a 9×9 checkerboard. In order to distinguish the color of each face, the six faces can be set respectively to be a black and red (255, 0, 0) checkerboard, a black and green (0, 255, 0) checkerboard, a black and blue (0, 0, 255) checkerboard, a black and cyan (0, 255, 255) checkerboard, a black and magenta (255, 0, 255) checkerboard, and a black and yellow (255, 255, 0) checkerboard, respectively.

In some embodiments, when changing the angle of the calibration object 10 in space, for any depth camera 201 and/or 501 in the first and second image capturing devices, it is preferable to ensure that the depth camera still photographs the same specific face. Because the subsequent calculations of the calibration parameters are performed based on the plurality of images of the same specific face of the calibration object 10 taken by the depth camera, for any depth camera 201 and/or 501, if the captured images include the images of other faces of the calibration object 10 in addition to the images of the specific face of the calibration object 10, the images of the other faces of the calibration object 10 will not be used. Of course, for any depth camera 201 in the image capturing devices, if the captured images include any images of other faces of the calibration object in addition to the images for the specific face, because the color of each face of the calibration object is different, it is easy to remove the images other than the images of the specific face taken by any depth camera 201.

In some embodiments, because the processor 301 is able to identify which images are captured by which depth camera 201, it is not specified that each depth camera 201 in the image capturing devices captures different faces of the calibration object 10. Two different depth cameras 201 and/or 501 can be allowed to photograph the same particular face.

It should be noted that those of ordinary skills in the art will appreciate that, when changing the angle of the calibration object 10 in space, it is possible that at two certain angles, faces of the calibration object 10 are in parallel planes. As a result, under these two angles, the images taken by each depth camera 201 are virtually counted as one image in the subsequent calibration calculation.

Therefore, in some embodiments, when changing the angle of the calibration object 10, it may be needed to ensure that the plurality of images captured by each depth camera 201 and/or 501 in the image capturing devices at all angles satisfy the subsequent calculation requirements for the internal parameters and the external parameters of the depth camera 201 and/or 501.

In some embodiments, the virtual display device 40 can import the point cloud data stored in the central computing device 30. According to the order of obtaining the point cloud data of each frame in all frames, the virtual image display device sequentially triangulates the point cloud data of each frame, performs color brightness modeling in the GPU, and obtains the user's current location information and azimuth angle.

The user's current location information and the azimuth angle can be input into the rendering engine of the GPU, so that the rendering engine can render an image at a viewing angle corresponding to the current user location and the azimuth angle. The image is then transmitted to the display screen for display to the user.

Based on the above, taking into account that an RGBD camera is able to retain both color brightness information and depth information with good performance, in some embodiments, the depth camera is an RGBD camera.

Figure 10:
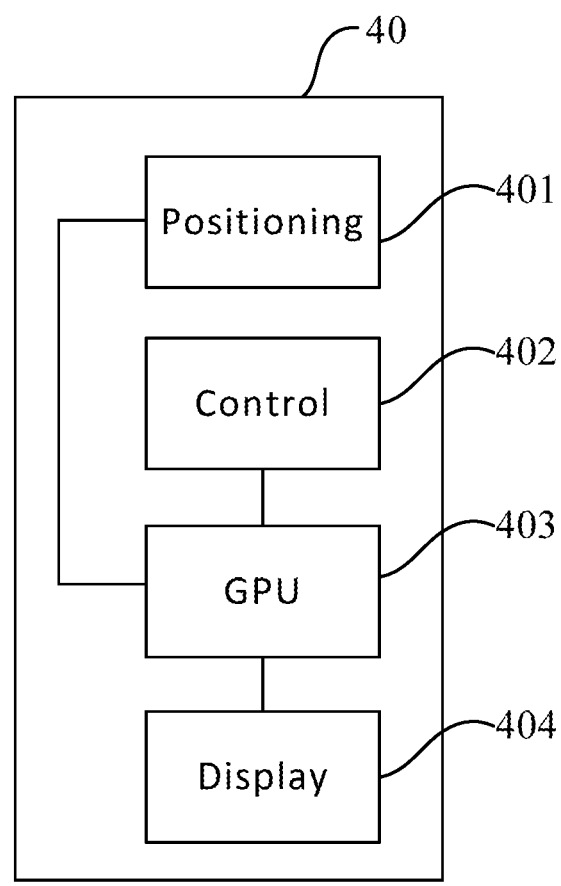
FIG. 10 is a schematic diagram of a virtual image display device according to some embodiments of the present disclosure.

Some embodiments of the present disclosure also provide a virtual display device 40, as illustrated in FIG. 10. The virtual image display device 40 can include a positioning detector 401, a controller 402, a graphics processor 403, and a display screen 404. The virtual display device 40 can be an AR/VR client device.

In some embodiments, the positioning detector 401 can be employed to acquire the user's current location information and azimuth angle.

In some embodiments, the controller 402 is configured to import the point cloud data stored in the central computing device 30. According to the order of obtaining the point cloud data of each frame in all the frames, the point cloud data of each frame can be sequentially transmitted to the graphics processor 403.

In some embodiments, the graphics processor 403, based on the user's current location information and azimuth angle acquired by the positioning detector 401, renders the image for the point cloud data of each frame at a viewing angle corresponding to the user's current location and azimuth angle. The image can then be transmitted to a display screen 404 to display.

In some embodiments, the display screen 404 is used for displaying the images to the user. The display screen 404 can be, for example, a liquid-crystal display (LCD), a light-emitting diode (LED) display such as an organic LED (OLED) display, etc.

When a user wears the virtual display device 40, the virtual image display device imports the point cloud data stored in the central computing device 30. In the order of obtaining the point cloud data of each frame in all the frames, the virtual image display device 40 sequentially renders the image for the point cloud data of each frame based on the user's current location and azimuth angle, so that when the user changes viewing angle or moves, the virtual image display device can render the image at the viewing angle corresponding to the user's current location and azimuth angle. As a result, 3D dynamic real-time navigation can be achieved.

One or more embodiments disclosed herein can have one or more of the following advantages. For example, a user can wear or carry an AR/VR client device to obtain a panoramic view of an environment. The panoramic view can have a 360° coverage. The 360° coverage according to some embodiments can be a horizontal panoramic coverage, and according to some embodiments can even be a more realistic coverage of the 3D space including upward and downward views. When the user turns his or her head, the rendered images emulate the realistic panoramic scene as if the user is viewing the scene using his or her own eyes while turning his or her head. Furthermore, the user can move in the 3D space, whether realistically by walking or running around while wearing or carrying the virtual image display device, or virtually by simulating the re-positioning or motion in the 3D space (e.g., "navigating" through the 3D space), while the rendered images also emulate what the user would see with his or her own eyes.

For example, the user can move around a target area/object, and view images of the target area/object through the virtual image display device from all the angles around the target area/object. In contrast, a conventional system, even if based on images captured by a 360° camera, can only emulate the views for the user if the user turns his or her head at the location of the 360° camera, but not the views if the user walk around the target area in an attempt to view the target area from different angles.

Implementations of the subject matter and the operations described in this specification can be implemented in digital electronic circuitry, or in computer software, firmware, or hardware, including the structures disclosed in this specification and their structural equivalents, or in combinations of one or more of them. Implementations of the subject matter described in this specification can be implemented as one or more computer programs, i.e., one or more modules of computer program instructions, encoded on one or more computer storage medium for execution by, or to control the operation of, data processing apparatus.

Alternatively, or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them.

Moreover, while a computer storage medium is not a propagated signal, a computer storage medium can be a source or destination of computer program instructions encoded in an artificially-generated propagated signal. The computer storage medium can also be, or be included in, one or more separate components or media (e.g., multiple CDs, disks, or other storage devices). Accordingly, the computer storage medium may be tangible.

The operations described in this specification can be implemented as operations performed by a data processing apparatus on data stored on one or more computer-readable storage devices, or received from other sources.

The term "client" or "server" include all kinds of apparatus, devices, and machines for processing data, including, by way of example, a programmable processor, a computer, a system on a chip, or multiple ones, or combinations of the foregoing.

The apparatus can include special purpose logic circuitry, e.g., an FPGA (field-programmable gate array), or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing, and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array), or an ASIC (application specific integrated circuit).

Processors suitable for the execution of a computer program include, by way of example, both general and special purpose microprocessors, and any one or more processors of any kind of digital computer. Generally, a processor will receive instructions and data from a read-only memory, or a random-access memory, or both. Essential elements of a computer can include a processor configured to perform actions in accordance with instructions and one or more memory devices for storing instructions and data.

Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few.

Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented with a computer and/or a display device, e.g., a VR/AR device, a head-mount display (HMD) device, a head-up display (HUD) device, smart eyewear (e.g., glasses), a CRT (cathode-ray tube), LCD (liquid-crystal display), OLED (organic light emitting diode), TFT (thin-film transistor), plasma, other flexible configuration, or any other monitor for displaying information to the user and a keyboard, a pointing device, e.g., a mouse, trackball, etc., or a touch screen, touch pad, etc., by which the user can provide input to the computer.

Other types of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending webpages to a web browser on a user's client device in response to requests received from the web browser.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The features disclosed herein may be implemented on a smart television module (or connected television module, hybrid television module, etc.), which may include a processing circuit configured to integrate Internet connectivity with more traditional television programming sources (e.g., received via cable, satellite, over-the-air, or other signals). The smart television module may be physically incorporated into a television set or may include a separate device such as a set-top box, Blu-ray or other digital media player, game console, hotel television system, and other companion devices. A smart television module may be configured to allow viewers to search and find videos, movies, photos and other content on the web, on a local cable TV channel, on a satellite TV channel, or stored on a local hard drive.

A set-top box (STB) or set-top unit (STU) may include an information appliance device that may contain a tuner and connect to a television set and an external source of signal, turning the signal into content which is then displayed on the television screen or other display device. A smart television module may be configured to provide a home screen or top-level screen including icons for a plurality of different applications, such as a web browser and a plurality of streaming media services, a connected cable or satellite media source, other web "channels," etc.

The smart television module may further be configured to provide an electronic programming guide to the user. A companion application to the smart television module may be operable on a mobile computing device to provide additional information about available programs to a user, to allow the user to control the smart television module, etc. In alternate embodiments, the features may be implemented on a laptop computer or other personal computer, a smartphone, other mobile phone, handheld computer, a tablet PC, or other computing device.

While this specification contains many specific implementation details, these should not be construed as limitations on the scope of any claims, but rather as descriptions of features specific to particular implementations. Certain features that are described in this specification in the context of separate implementations can also be implemented in combination in a single implementation. Conversely, various features that are described in the context of a single implementation can also be implemented in multiple implementations separately or in any suitable subcombination.

Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking or parallel processing may be utilized.

All references cited in the present disclosure are incorporated by reference in their entirety. Although specific embodiments have been described above in detail, the description is merely for purposes of illustration. It should be appreciated, therefore, that many aspects described above are not intended as required or essential elements unless explicitly stated otherwise.

Various modifications of, and equivalent acts corresponding to, the disclosed aspects of the exemplary embodiments, in addition to those described above, can be made by a person of ordinary skill in the art, having the benefit of the present disclosure, without departing from the spirit and scope of the disclosure defined in the following claims, the scope of which is to be accorded the broadest interpretation so as to encompass such modifications and equivalent structures.

The invention claimed is:

1. A method for displaying a virtual image, comprising:
providing a virtual image display device configured to be worn by a user, the virtual image display device including a positioning detector and a graphics processor, the positioning detector being configured to detect a current location and azimuth angle of the user;
obtaining the current location and azimuth angle of the user from the positioning detector;
capturing a plurality of first depth images with a first image capturing device comprising one or more first depth cameras from a plurality of positions at a same time;
transmitting the plurality of first depth images to a central computing device in real time;
integrating the plurality of first depth images as one frame, based on calibration parameters of the one or more first depth cameras;
performing point cloud stitching of a plurality of frames;
obtaining point cloud data for the plurality of frames in an order one by one;
rendering an image of each of the plurality of frames corresponding to the current location and azimuth angle of the user in the order by utilizing the graphics processor; and
displaying the image being rendered on the virtual image display device being worn by the user;
wherein the image being rendered emulates what the user would see with his or her own eyes, not from a location of the first image capturing device;
the method further comprising:
obtaining calibration parameters of a depth camera among the one or more first depth cameras, including:
using a preset polyhedron as a calibration object, wherein each face of the calibration object comprises a checkerboard and each face is distinguished by different colors;
capturing images of a specific face of the calibration object by the depth camera at a plurality of angles, by changing an angle of the calibration object in space;
transmitting the captured images;
calculating internal parameters and external parameters of the depth camera, based on the captured images; and
obtaining calibration parameters according to the internal parameters and the external parameters.

2. The method of claim 1, wherein:
the one or more first depth cameras are movable and configured to capture the depth images from the plurality of positions.

3. The method of claim 2, wherein:
the one or more first depth cameras are configured to move among the plurality of positions through at least one of a rigid arm, a gimbal, a cable, or an unmanned aerial vehicle (UAV).

4. The method of claim 1, wherein the one or more first depth cameras are configured to capture the depth images around a target area with a 360° coverage.

5. The method of claim 1, further comprising:
capturing a plurality of second depth images with a second image capturing device comprising a plurality of second depth cameras at the same time;
transmitting the plurality of second depth images to the central computing device in real time; and
integrating the plurality of second depth images and the plurality of first depth images as the one frame, based on the calibration parameters of the one or more first depth cameras and calibration parameters of the plurality of second depth cameras;
wherein the second image capturing device has a second ground clearance and a second pitching angle both different from a first ground clearance and a first pitching angle of the first image capturing device.

6. The method of claim 1, wherein said performing the point cloud stitching comprises employing at least one of: an iterative closest point (ICP) algorithm, an iterative closest line (ICL) algorithm, or an iterative closest triangle patch registration (ICT) algorithm.

7. The method of claim 1, further comprising:
compressing and storing the point cloud data with at least one of a uniform sampling method, a magnification reduction method, a chord offset method, or a grid method.

8. The method of claim 7, wherein the compressing and storing the point cloud data comprises employing an octree mode of the grid method.

9. The method of claim 1, wherein the rendering the image comprises:
performing a point cloud data triangulation, for each of the plurality of frames sequentially in the order;
modeling color brightness in the graphics processor.

10. The method of claim 9, wherein the performing the point cloud data triangulation comprises employing at least one of a changing edge method, a point addition method, or a division possession method.

11. The method of claim 10, wherein the performing the point cloud data triangulation comprises employing greedy triangle projection of the division possession method.

12. The method of claim 9, wherein the obtaining the current location and azimuth angle of the user comprises employing an instant positioning technique.

13. The method of claim 12, wherein the obtaining the current location and azimuth angle of the user comprises employing a Simultaneous Localization and Mapping (SLAM) technique.

14. The method of claim 1, wherein:
the one or more first depth cameras have a coverage of 360°.

15. A virtual image display system, comprising:
a first image capturing device;
a central computing device; and
a virtual image display device configured to be worn by a user, the virtual image display device including a positioning detector, the positioning detector being configured to detect a current location and azimuth angle of the user;
wherein:
the first image capturing device including one or more first depth cameras configured to capture a plurality of first depth images and transmit the plurality of first depth images to the central computing device in real time;
the central computing device is configured to:
integrate the plurality of first depth images as one frame, based on calibration parameters of the one or more first depth cameras;
perform point cloud stitching of a plurality of frames; and
obtain point cloud data for the plurality of frames in an order one by one;
the virtual image display device is configured to:
render an image of each of the plurality of frames corresponding to the current location and azimuth angle of the user in the order; and
display the image being rendered;
wherein the image being rendered emulates what the user would see with his or her own eyes, not from a location of the first image capturing device;
wherein:
the central computing device comprises a processor and a memory;
the memory stores the calibration parameters of the one or more first depth cameras;
the processor is configured to:
eliminate redundant data; and
compress and save the point cloud data in the memory.

16. The virtual image display system of claim 15, further comprising:
a second image capturing device including a plurality of second depth cameras,
wherein:
the second image capturing device has a second ground clearance and a second pitching angle both different from a first ground clearance and a first pitching angle of first image capturing device; and
the second image capturing device is configured to:
transmit a plurality of second depth images captured by the plurality of second depth cameras to the central computing device in real time.

17. A virtual image display device, comprising:
a display screen, the display screen configured to be worn by a user and provide a panoramic view to the user;
a positioning detector coupled to the display screen;
a controller locally connected to the display screen; and
a graphics processor locally connected to the display screen;
wherein:
the positioning detector is configured to obtain a current location and azimuth angle of the user;
the controller is configured to:
import point cloud data from a central computing device; and
sequentially transmit the point cloud data of each frame to the graphics processor according to an order of obtaining the point cloud data of each frame in a plurality of frames; and
the graphics processor is configured to render an image of the each frame in the plurality of frames corresponding to the current location and azimuth angle of the user in the order;
the display screen is configured to display the image being rendered to the display screen being worn by the user;
wherein the image being rendered emulates what the user would see with his or her own eyes, not from a location of the first image capturing device;
wherein the graphics processor is configured to render the image by:
performing a point cloud data triangulation, for each of the plurality of frames sequentially in the order; and
modeling color brightness; and wherein the positioning detector is configured to obtain the current location and azimuth angle of the user by employing an instant positioning technique.

* * * * *